(No Model.)
J. S. NOWOTNY.
ELECTRIC BATTERY.
No. 466,798. Patented Jan. 12, 1892.
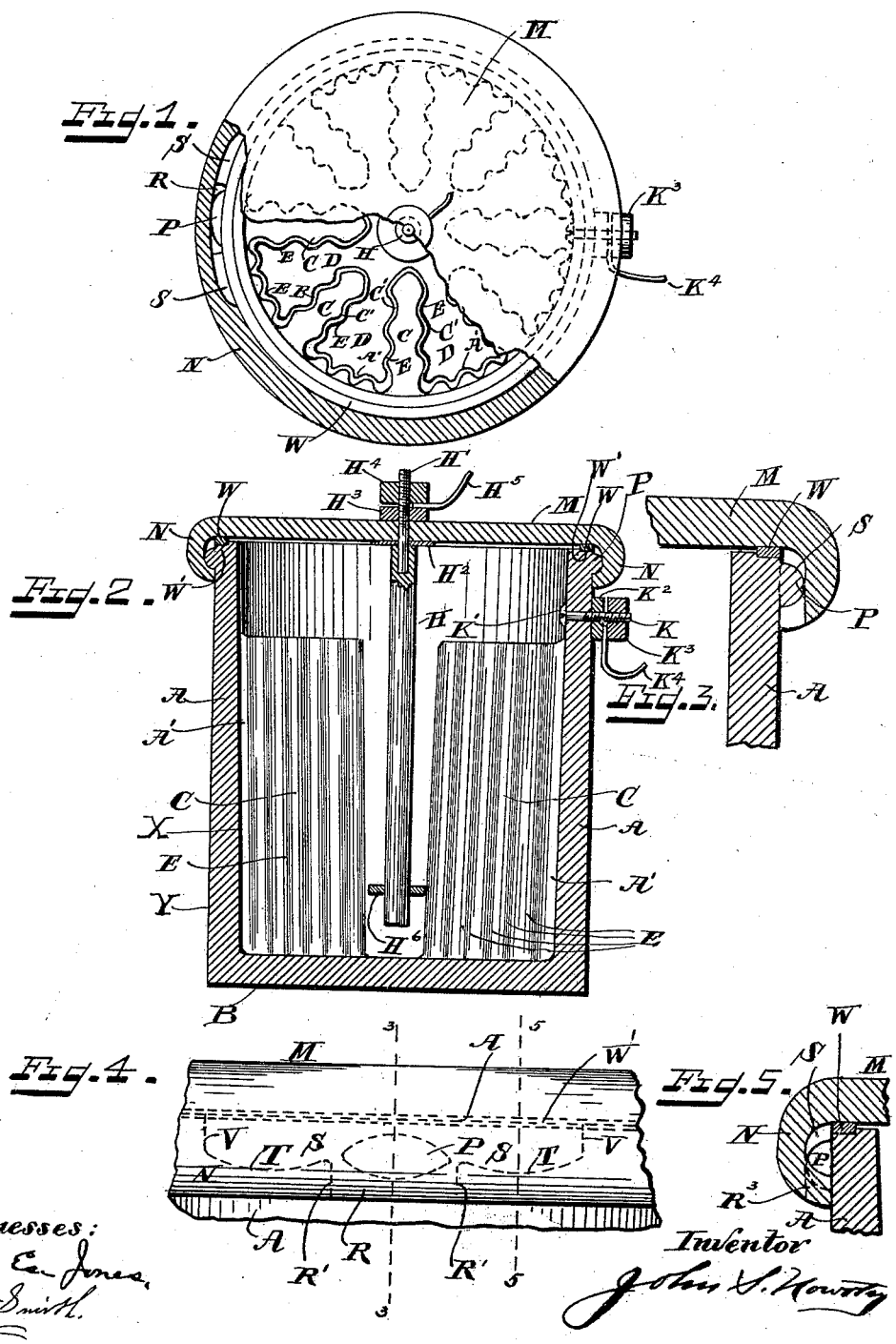

UNITED STATES PATENT OFFICE.

JOHN S. NOWOTNY, OF CINCINNATI, OHIO, ASSIGNOR OF ONE-FOURTH TO WILLIAM H. ROBINSON, OF COVINGTON, KENTUCKY.

ELECTRIC BATTERY.

SPECIFICATION forming part of Letters Patent No. 466,798, dated January 12, 1892.

Application filed March 23, 1891. Serial No. 386,152. (No model.)

*To all whom it may concern:*

Be it known that I, JOHN S. NOWOTNY, a citizen of the United States, and a resident of the city of Cincinnati, in the county of Hamilton and State of Ohio, have invented certain new and useful Improvements in Electric Batteries, of which the following is a specification.

The several features of my invention and the various advantages resulting from their use, conjointly or otherwise, will be apparent from the following description and claims.

In the accompanying drawings, making a part of this specification, and to which reference is hereby made, Figure 1 is a top view of a battery embodying my invention, the cover of the battery being partially broken away and at its rim cut down to show the construction of the battery beneath and the preferred form of recess in the rim of the cover intended to receive the projection of the exterior of the outer circular wall of the battery for enabling the cover to be secured to the battery. Fig. 2 shows a vertical central section of this battery. Fig. 3 shows a vertical section on an enlarged scale at the dotted line 3 3 of Fig. 4 for the purpose of better illustrating the preferred construction whereby the cover is secured to the battery. Fig. 4 is an elevation, on an enlarged scale, of a portion of the cover, a portion of the battery being seen below the lower edge of the cover. This figure is for the purpose of illustrating by means of dotted lines traced therein the shape of the recess in the cover and the shape in front elevation of the projection on the battery for entering said recess and engaging with said cover. Fig. 5 is a vertical central section, on an enlarged scale, of a part of the cover and a part of the outer wall of the said battery, and showing in end elevation the projection thereon for engaging the cover. This section is taken at the dotted line 5 5 of Fig. 4.

One of the principal objects of my invention is to provide in an open-circuit primary battery a maximum of surface for contact with the battery-liquid, thereby obtaining certain marked advantages hereinafter specified.

I will now proceed to describe my invention in detail.

A indicates the external wall of the battery. This wall is of a cylindrical form, and exteriorly is preferably of the same width or diameter at the top and at the bottom. B is the bottom of the battery and is at its outer edge connected to the wall A. At suitable intervals on the inner side of this wall A are projections or walls C, which extend from the outer or main wall A inwardly toward the vertical or axial center of the battery. In the preferred construction these inner walls C extend down to and meet the bottom B of the battery. For the purpose of obtaining the greatest amount of superficial area to present to the action of the liquid of the battery these radial walls C extend quite near to the vertical center of the battery. The reason why they do not extend quite to the center is because a vertical space is there left for the insertion of a long zinc H, preferably round in cross-section and extending down into the battery at the center of the battery and nearly to the bottom thereof, and also because around this zinc H is left a space for the liquid in the battery to reach and circulate around the battery and have ready and sufficient access to the chambers D, each of the latter being formed by a part of the main wall A of the battery and the opposing surfaces C' C' of two of the radial walls C, and for the same reason I construct every other wall C of a shorter radial extent or length than the other walls C, inasmuch as this gives the battery-liquid a better opportunity to circulate around the zinc H and to enter the chambers D. I have also devised the following construction for still further increasing the superficial area or surface exposed to the action of the battery-liquid, viz: I corrugate those portions of the inner wall A of the battery which form the rear surface A' of the chamber, and I also corrugate the surfaces C' of the walls C. The corrugations thus resulting I denominate E. The corrugations E as to their length might run horizontally, but preferably run vertically, as thus they collect less dirt and also can be more readily cleaned of whatever dirt collects upon their surfaces. Furthermore, when running vertically, as shown, they are more readily made, as will now be specified.

A practical mode of manufacturing the battery is by dies, and for the full and perfect operation of the dies the interior portions of the battery should be formed so that the plunger or interior die can be readily withdrawn out of the upper end of the battery without disturbing the form into which the various parts of the batteries have been compressed by the die. This formation consists, in general, in giving to those sides of the walls which are within the battery a slope or incline, resulting in making the walls thicker at the bottom than at the top.

The inclination of the inner side of the outer or main wall A of the battery is seen in Fig. 2, and in this figure there is also seen the inclination of the inner edges of two of the radial walls, the inner edges of the other radial walls being likewise inclined. The inclination of the sides of the radial walls is shown in Fig. 1, the outer line of each radial wall showing the dimensions of the wall at its base and the inner line indicating the dimension of the wall at its top.

It will be understood that the radial walls are arranged around the center of the battery, and, while those only on one side of the center in Fig. 1 are shown in solid lines, nevertheless others are present, as mentioned, and their presence is indicated by dotted lines on that part of the cover shown in said Fig. 1. The top of the radial walls should be at least as high as the upper surface of the liquid within the battery. A suitable height for these walls is shown in Fig. 2.

I have here a battery readily constructed, economical of manufacture, and very serviceable in action. The battery has an extraordinary superficial carbon area or surface exposed to the action of the battery-liquid, and consequently affords a high degree of electrical pressure or power in proportion to the size of the battery and the amount of liquid it contains. The battery can be employed as a closed-circuit one when the battery-liquid contains an acid, as sulphuric, &c., and it can be employed as an open-circuit one when provided with a solution of sal-ammoniac, &c.

To prevent the rapid evaporation of the liquid within the battery and also to provide a support for the zinc H, I provide a cover M, having at its periphery a vertical flange N, extending down below the level of the under surface of the cover.

It is desirable that the cover be provided with some suitable device for fastening it securely to the battery. A preferred form of such device is shown and is as follows: For the purpose of rendering the joint or line of union between the cover and battery a tight one a ring of rubber packing W is interposed between the said cover and battery, and that this packing may be held in place at all times a recess W' is provided in the top edge of the wall A of the battery, this recess being preferably at the outer portion of said edge, as shown. The main wall A, near its top and at two points diametrically opposite, has a stud or catch projection P. The shape of each of these catches is as follows: In front the shape of the catch is that of a long oval pointed at each end, (see Fig. 4,) and its shape viewed from the top or bottom is that of the half of a long oval. (See Fig. 1.) The shape of it in vertical central section is shown in Fig. 3. In the inner side of the flange of the cover are openings or recesses, respectively, for the reception and retention, &c., of the respective catch projections P, as follows: In Fig. 4 the upper straight horizontal dotted line indicates the roof of the cover, and the next horizontal dotted line below indicates the top of the main wall A, and the next (third) horizontal dotted line below points out the bottom of the said recess W' of the main wall A. There is an opening or approach R in the lower portion of the edge or flange N of the cover. The width of this recess is shown by the vertical dotted lines R' R' in Fig. 4, and the depth of the opening—viz., in a direction from the periphery of the cover toward its center—is indicated in Fig. 5 by the vertical dotted line $R^3$ and the outer surface of wall A. Above the entrance R is the recess S. This recess S is longer than the recess R is wide between lines R' R' and extends out in the direction parallel to the periphery of the cover beyond each line R' of the recess R. The top of the recess S is the bottom surface of the cover proper, (see Figs. 3 and 5,) and the bottom thereof to the right and left of the entrance R is shown by the dotted lines T, and the ends of the recess S are shown by the dotted lines V. Each bottom portion T curves down a little at its center, substantially as shown.

In applying the cover to the battery the former is applied to the top of the latter, so that the downward-extending flange N encircles the outer surface of the top part of the wall A, the top part of the cover resting on the flange N, and the entrances R having respectively received its adjacent catch-lug P. Now each catch-lug will occupy the position shown in Fig. 4. The cover is then rotated either to the left or to the right. By such movement the catch-lug P will mount on the adjacent edge of the bottom T, and by its inclined form draw down the cover and compress the packing-ring W. As the rotation of the cover is continued in the same direction the catch-lug will continue to move along over the adjacent bottom T until it impinges against the adjacent end wall V of recess S. The curve of the bottom T will have allowed the cover to have slightly risen, but not enough to release the packing-ring from sufficient pressure to keep the joint between the cover and battery tight. The curved shape of the bottom of the catch-lug and the curve of the bottom T, together with the resiliency of the rubber, keeping said bottoms together, operate to retain the cover in such position until rotated back by human agency. After the battery-cell having the outer wall and the inwardly-projecting walls and bottom B have been made a coating of paraffine X is applied to the cell, and not only so, but the outer portion of the wall A and of the bottom B for a certain distance inwardly in said wall receives paraffine into the minute cells of the carbon and makes it proof against the exit of the liquid within the battery. I am enabled to accomplish this result by heating the cell and applying the paraffine while in a warm liquid condition to the cell. The outer surface thus prepared is next subjected to a coating of shellac Y. This last-named coating outside of the paraffine X imparts a hard, glossy, and splendid finish to the exterior of the cell. The upper portion of the cell—viz., the wall A down to or in the neighborhood of the tops of the radial walls C—is subjected, while hot, both on the inside and on the outside to a liquid bath of hot paraffine X, the paraffine thoroughly entering the pores or interstices of the wall A and rendering it impervious to the liquid in the battery. Thus the liquid cannot by capillary attraction mount up the wall A to the contacts. This is an advantage, especially where the contacts are of brass. The coating of shellac Y aforementioned is preferably applied after the several applications of paraffine X to the battery have been made.

The wall A and bottom B and the radial walls are to be of a material suitable for constituting the opposite pole to that formed by the rod or electric pole H. As carbon is at present one of the kinds of material most desirable for constituting the pole opposite to that formed by the rod or electric pole H, I have employed it in the present illustration of my invention.

One of the convenient and desirable modes of securing the zincs to the cover is as follows: The lower end of a rod H', screw-threaded at its upper half or portion, is cast in or otherwise firmly secured in or to the top part of the zinc H. The rod extends up through the cover and extends above the latter, and its screw-threaded portion there receives two nuts $H^3$ and $H^4$. The former serves to uphold, substantially as shown, the zinc, and the upper nut presses a wire $H^5$, making a part of the electric circuit, down onto the nut $H^3$, thereby making a perfect contact. A rubber disk or ring $H^2$ is interposed between the upper end of the zinc and the under surface of the cover, and as the nut $H^3$ is tightened on the cover the ring $H^2$ will be compressed and the escape of corroding gas from the battery to the rod H' and the nuts $H^3$ and $H^4$ will be prevented. A rubber ring $H^6$ is located on and around the lower part of the zinc to prevent the latter from accidentally coming into contact with the walls C and thereby short-circuiting the battery.

The battery is provided with a suitable contact device. One description of such contact is illustrated more particularly in Fig. 2, and consists of a screw-threaded bolt or screw K, extending through the wall A of the battery, and having a head, as K', at the inside of the wall, two nuts $K^2$ and $K^3$ being screwed on this bolt outside of wall A, the nut $K^2$ being tightened, so as to tightly grasp the wall between it and the screw-head K'. Between the two nuts $K^2$ $K^3$ is tightly held the wire $K^4$, making part of the electric circuit in connection with this battery. Of course the wires $K^4$ and $H^5$ are to be of any desired length.

The contacts H' $H^3$ $H^4$ and K' $K^2$ $K^3$ are preferably made of the metal aluminum, as contacts made of aluminum are not subject to the corrosive action of the chemicals of the battery, even when the injurious action of the said chemicals is increased by electrical action.

While the various features of my invention are preferably employed together, one or more of said features may be employed without the remainder and, in so far as applicable, in connection with other batteries.

What I claim as new and of my invention, and desire to secure by Letters Patent, is—

1. A carbon battery having radially-projecting walls C extending from the outer wall A toward a common center, the sides of the walls being corrugated, the said walls and bottom B being of carbon, substantially as and for the purposes specified.

2. A carbon battery having an outer wall A and walls C radially extending inwardly therefrom and provided with corrugations running vertically, substantially as and for the purposes specified.

3. A carbon battery having an outer wall A and walls C radially extending inwardly therefrom and forming chambers D, the sides of the walls C and the inner surface of wall A being corrugated and of carbon, substantially as and for the purposes specified.

4. A carbon battery having a circumambient wall A and walls C radially extending inwardly therefrom and leaving a central space or chamber, one series of these walls C extending a less distance toward the center than the other series, the chambers formed by and between these walls connecting to the central space or chamber, the walls C and A of the chambers being of carbon, substantially as and for the purposes specified.

5. A battery having a circumambient wall A and walls C radially extending inwardly therefrom and leaving a central space or chamber, one series of these walls C extending a less distance toward the center than the other series, the chambers formed by and between these walls connecting to the central space or chamber, the sides of the chambers being provided with corrugations and being of carbon, substantially as and for the purposes specified.

6. A battery having a circumambient carbon wall and carbon walls C radially extending inwardly therefrom and leaving a central space or chamber, one series of these walls C extending a less distance toward the center than the other series, the carbon chambers formed by and between these walls connecting to the central space or chamber, and a zinc H, located in the central chamber, substantially as and for the purposes specified.

7. A battery having a circumambient wall A and walls C radially extending inwardly therefrom and leaving a central space or chamber, one series of these walls C extending a less distance toward the center than the other series, the chambers formed by and between these walls connecting to the central space or chamber, the sides of the chambers being of carbon and provided with corrugations increasing the carbon-surface, and a zinc H, located in the central chamber, substantially as and for the purposes specified.

8. A carbon battery having the circumambient wall A and the radial walls C extending therefrom into the interior space of the battery and the rod or pole H, the said wall A and walls C and bottom B being of a material constituting the opposite pole to that formed by the rod or pole H, the sides of the chambers or sub-cells formed by the said walls being provided with corrugations for increasing the surface they present to the battery-liquid, substantially as and for the purposes specified.

9. In combination with the battery, the cover M, having flange N and recess consisting of entrance-opening, main recess S S, extending at the side of the entrance R, and the catch-lug P, of an elongated oval form, substantially as and for the purposes specified.

10. In combination with the battery, the cover M, having flange N and recess consisting of entrance opening, main recess S S, extending at the side of the entrance R and having the curved bottoms T T, and the catch-lug P, of an elongated oval form, substantially as and for the purposes specified.

11. In combination with the battery, the cover M, having flange N and recess consisting of entrance-opening, main recess S S, extending at the side of the entrance R, and the catch-lug P, of an elongated oval form, the packing-ring W, and the circumambient wall having recess W', receiving the lower portion of said packing-ring, the latter being interposed between the wall and the cover, substantially as and for the purposes specified.

12. A carbon cell having sub-cells integral with the carbon of the outer cell, the outer surface of the outer cell being filled with paraffine coated with a coating of shellac, substantially as and for the purposes specified.

13. A carbon cell whose outer surface has been filled with paraffine and coated with shellac, substantially as and for the purposes specified.

14. A carbon cell whose upper portion has been filled with paraffine both on the inside surface of the cell as well as on the outside down to a point below where the contacts are secured to it, the remainder or lower portion of the said inner surface of the carbon cell being left untreated with paraffine, substantially as and for the purposes specified.

15. A carbon cell having its outer surface filled with paraffine and coated with shellac and the upper portion filled with paraffine below the point where the contacts are secured to it, substantially as and for the purposes specified.

JOHN S. NOWOTNY.

Attest:
WM. E. JONES,
K. SMITH.